United States Patent [19]

Sugimoto

[11] Patent Number: 5,655,630

[45] Date of Patent: Aug. 12, 1997

[54] BICYCLE BRAKE DEVICE

[75] Inventor: Masanori Sugimoto, Sakai, Japan

[73] Assignee: Shimano, Inc., Sakai, Japan

[21] Appl. No.: 519,207

[22] Filed: Aug. 24, 1995

[30] Foreign Application Priority Data

Aug. 24, 1994 [JP] Japan .................. 6-199445

[51] Int. Cl.⁶ .................. B62L 1/06; B62L 3/00
[52] U.S. Cl. .................. 188/24.22; 188/24.11
[58] Field of Search .................. 188/24.11, 24.12, 188/24.19, 24.21, 24.22, 26, 73.1

[56] References Cited

U.S. PATENT DOCUMENTS

| | | | |
|---|---|---|---|
| 2,699,288 | 1/1955 | Mennesson | 188/24 |
| 3,628,635 | 12/1971 | Yoshigai | 188/26 |
| 4,027,746 | 6/1977 | Kine | 188/24.21 |
| 4,036,333 | 7/1977 | Mathauser | 188/24.12 |
| 4,051,924 | 10/1977 | Yoshigai | 188/24.12 |
| 4,391,352 | 7/1983 | Brown | 188/24.12 |
| 4,441,592 | 4/1984 | Everett | 188/24.12 |
| 5,103,938 | 4/1992 | Yoshigai | 188/24.22 |
| 5,215,167 | 6/1993 | Davidson | 188/24.21 |

FOREIGN PATENT DOCUMENTS

| | | | |
|---|---|---|---|
| 848770 | 11/1939 | France . | |
| 919492 | 3/1947 | France . | |
| 642798 | 7/1962 | Italy . | |
| 62-1873 | 1/1987 | Japan . | |
| 209472 | 3/1993 | Japan . | |
| 0008704 | of 1900 | United Kingdom | 188/24.12 |
| 592000 | 7/1945 | United Kingdom . | |
| 609401 | 9/1948 | United Kingdom . | |

*Primary Examiner*—Robert J. Oberleitner
*Assistant Examiner*—Chris Schwartz
*Attorney, Agent, or Firm*—James A. Deland

[57] ABSTRACT

A brake mechanism includes a brake arm having a lower portion for being pivotally mounted to the bicycle and a link member having an upper portion and a lower portion. A shoe attachment member for attaching a brake shoe is coupled to an upper portion of the brake arm and to an upper portion of the link member. The lower portion of the brake arm and the lower portion of the link member are adapted to be pivotally mounted to the bicycle so that the shoe attachment member maintains a generally horizontal attitude when the brake arm pivots relative to the bicycle.

17 Claims, 6 Drawing Sheets

BICYCLE BRAKE DEVICE

BACKGROUND OF THE INVENTION

The present invention is directed to braking devices for bicycles and, more particularly, to a brake device which is supported by fastening pins extending from seats installed on the front fork or rear fork of a bicycle, and which is driven by a brake wire so that brake shoes are pressed against the rim of the corresponding wheel.

In the case of bicycles which allow off-road riding (known as mountain bikes (MTB) or all-terrain bikes (ATB)), cantilever type brake mechanisms are generally mounted on the bicycles in order to provide a strong braking force. One end of each of the brake arms is supported on the front fork or rear fork so that the end is free to pivot, while the other end of each brake arm is connected to the brake wire. The brake shoes are installed on intermediate portions of the brake arms so that the brake shoes face both side surfaces of the bicycle wheel rim.

In such a cantilever type bicycle brake mechanism, the brake arms are caused to pivot in the closing direction by using a brake lever to pull the brake wire. As a result, the brake shoes are pressed against the aforementioned rim so that braking is applied. Such a cantilever type brake mechanism offers many advantages. For example, there is no need to alter the shape of the brake mechanism in accordance with the size of the bicycle (as is necessary in the case of caliper brake mechanisms). Furthermore, braking force tends to be much more even than with caliper brake mechanisms.

Unfortunately, cantilever type brake mechanisms suffer from problems of their own. For example, if the brake shoes pivot downward from the horizontal plane as a result of the pivoting of the brake arms, so that the brake shoes contact the side surfaces of the rim without conforming to the inclination of the side surfaces, then the pressing force of the brake shoes is reduced. Accordingly, it is necessary to adjust the relative attachment positions of the rim side surfaces and the brake mechanism with a high degree of precision, and such adjustment work is difficult.

One technique for solving this problem is disclosed in Japanese Patent Application Kokoku No. 62-1873. The brake mechanism disclosed in this document is constructed from [a] brake arms which are supported on fastening pins (extending from seats) so that the brake arms are free to pivot, with the upper ends of the brake arms being positioned to the outside of the fastening pins, [b] output links which are supported at intermediate points on the brake arms so that the output links are free to pivot, and which extend outward, [c] driven links which are connected to the aforementioned output links so that the driven links are free to pivot, and which extend downward, and [c] stationary links which are connected to the aforementioned driven links in a manner that allows free pivoting, and which also extend inward and are fastened to the aforementioned fastening pins in a manner that prevents pivoting. In this brake mechanism, the brake arms are caused to pivot upward by the brake wire, thus causing the driven links to pivot inward, so that the output links move in a horizontal or upward-facing attitude. As a result, the brake shoes contact the sides surfaces of the rim in a horizontal or upward-facing attitude.

Unfortunately, with this structure, the driven links are positioned outside the brake arms, so that the width dimension of the brake mechanism is increased. As a result, in cases where this brake mechanism is used as a front brake, the front brake tends to strike the rider's shins, etc., when the handlebars are turned. Furthermore, in cases where the brake mechanism is used as a rear brake, the brake mechanism tends to strike the rider's heels or calves, etc., while the rider is pedaling.

SUMMARY OF THE INVENTION

The present invention is directed to a bicycle brake device which ensures that the brake shoes contact the side surfaces of the rim in a horizontal or upward-facing attitude, but which is constructed with a substantially reduced width than known structures. In one embodiment of the present invention, each brake mechanism includes a brake arm having a lower portion for being pivotally mounted to the bicycle and a link member having an upper portion and a lower portion. A shoe attachment member for attaching a brake shoe is coupled to an upper portion of the brake arm and to an upper portion of the link member. The lower portion of the brake arm and the lower portion of the link member are adapted to be pivotally mounted to the bicycle. The upper portion of the link member and the upper portion of the brake arm are mounted to the shoe attachment member so that the upper portion of the link member and the upper portion of the brake arm are spaced apart from each other, and the lower portion of the link member is adapted to be mounted to the bicycle so that the lower portion of the link member is spaced apart from the lower portion of the brake arm. Preferably, the link member is mounted between the brake arm and a brake shoe mounted to the shoe attachment member. If desired, the fastening pin may include a supporting member for attachment of the lower portion of the link member so that the link member does not have to be connected directly to the seat.

In a particular embodiment of bicycle brake device of the type which is supported by fastening pins extending from seats installed on the front fork or rear fork of a bicycle, the lower portion of the brake arm may be adapted to be pivotally mounted to the fastening pin, and the lower portion of the link member may be adapted to be pivotally mounted to the seat. The overall connection of the device may be such that the shoe attachment member maintains a generally horizontal or upward-facing attitude when the brake arm pivots relative to the bicycle. If the seat is provided with a plurality of holes, for example, disposed on a common circumferential line centered on the axis of the fastening pin, then the attitude of the shoe attachment members can be altered to accommodate different shapes and sizes of the wheel rim by selecting the holes in which the link members are mounted.

In more specific embodiments of the present invention, a biasing member is connected to the brake arm for biasing the shoe attachment member toward an open position. To help adjust the brake shoe relative to the wheel rim, the shoe attachment member includes an elongated slot, and the brake shoe comprises a pin extending through the slot. The pin has a threaded portion on a first end and a friction pad mounted to a second end. A nut is disposed on the threaded portion of the pin. A convex member is disposed between the attachment member and the friction pad, and a concave member is disposed between the attachment member and the friction pad for engaging the convex member. A convex member is disposed between the attachment member and the nut, and a concave member is disposed between the attachment member and the nut for engaging the convex member.

DETAILED DESCRIPTION OF THE EMBODIMENTS

Figure 1:
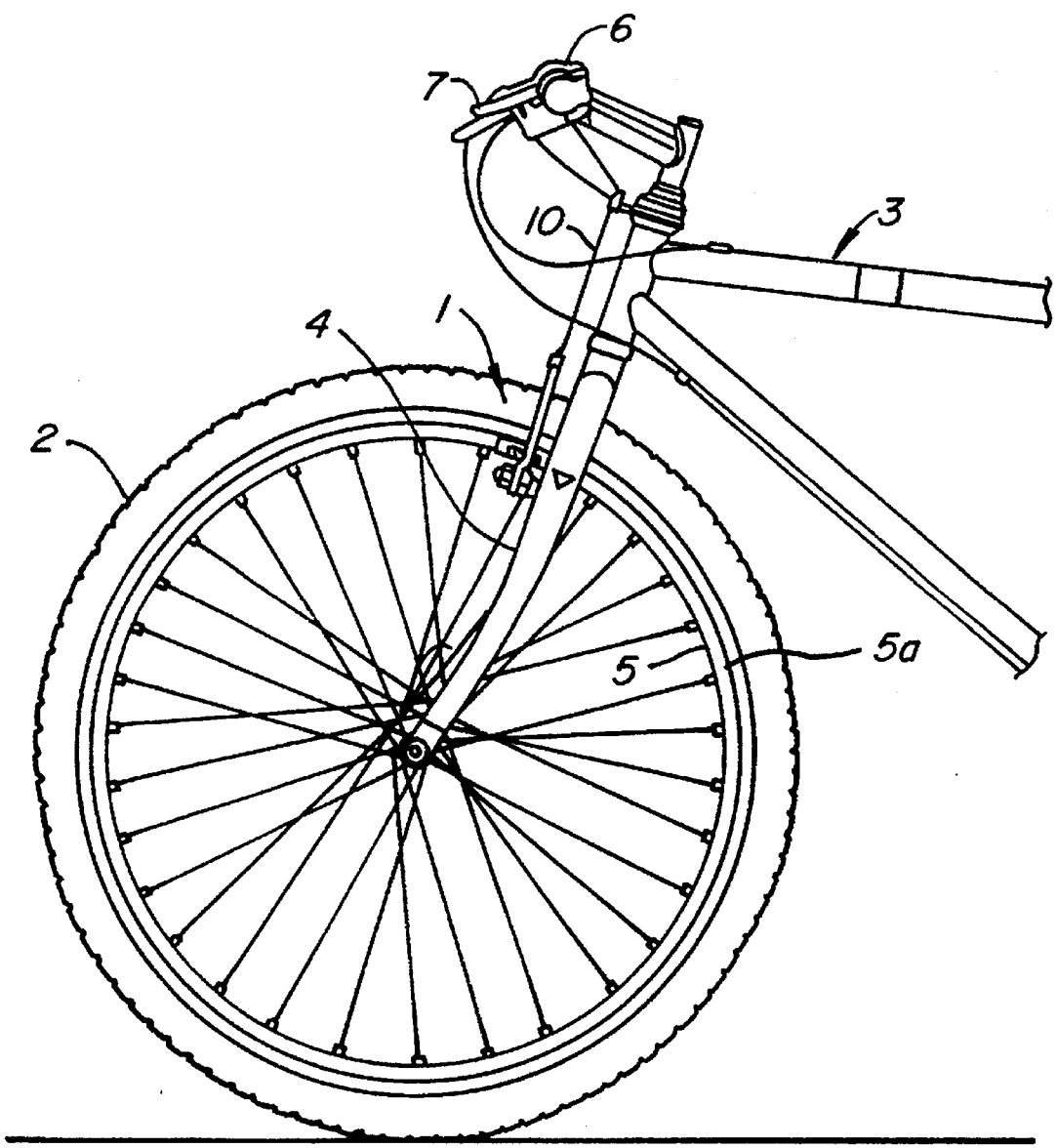
FIG. 1 is a side view of a front portion of a bicycle using a particular embodiment of a braking device according to the present invention.

The bicycle brake mechanism 1 shown in FIG. 1, which uses one embodiment of the present invention, is (for example) a front wheel brake mechanism, and is supported at an intermediate point on the front fork 4 of the frame 3 so that the mechanism is free to pivot. The brake mechanism 1 performs a braking action by pressing against both side surfaces 5a of the rim 5 of the front wheel 2.

Figure 2:
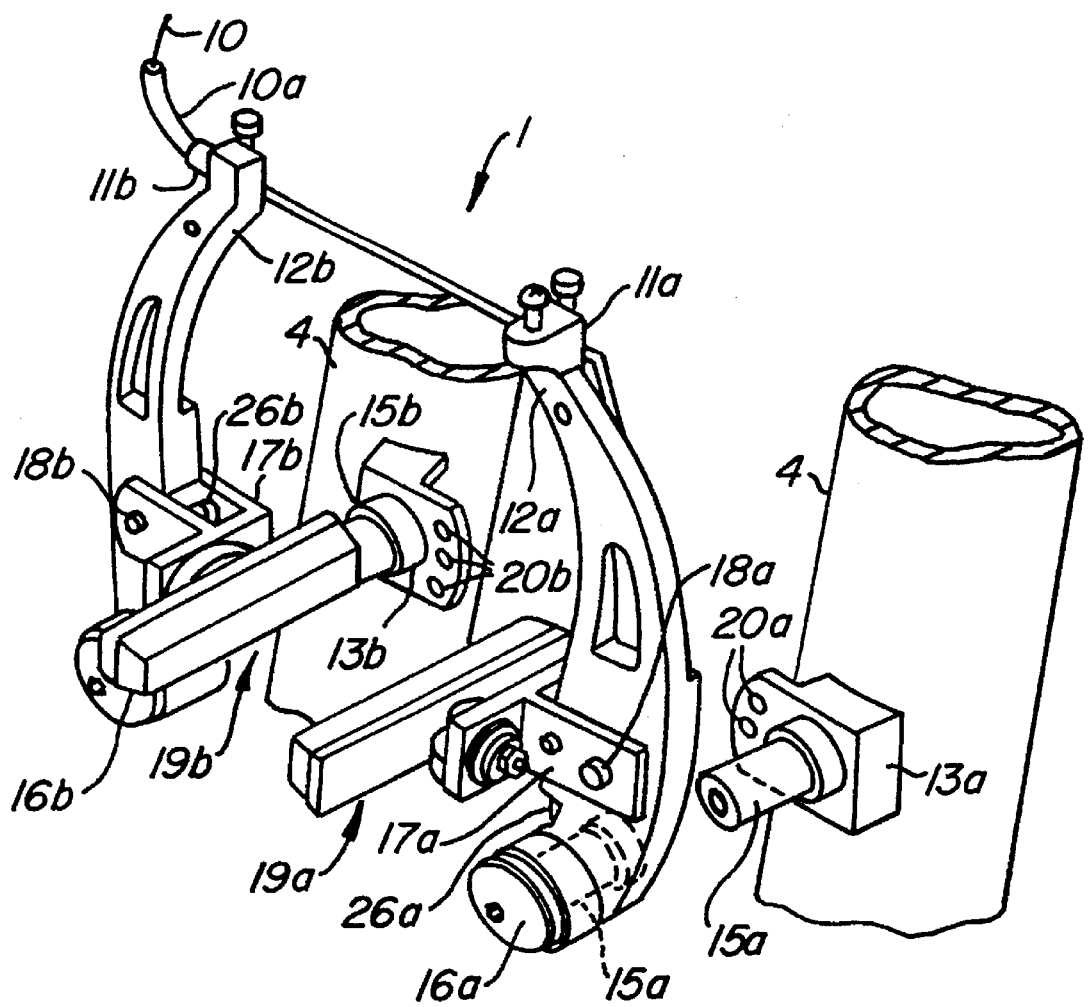
FIG. 2 is a perspective view of a particular embodiment of a bicycle brake device according to the present invention.
Figure 3:
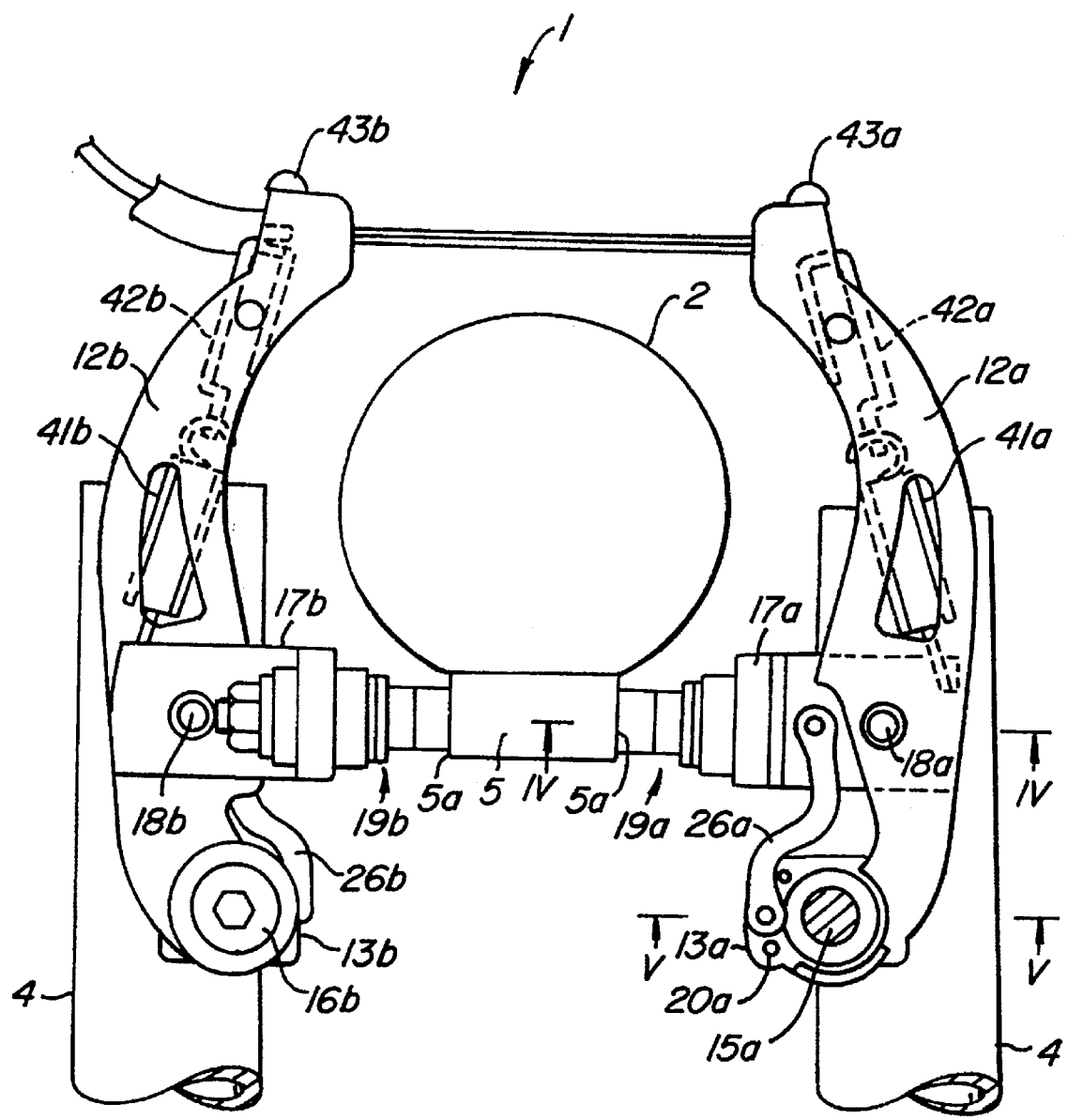
FIG. 3 is a front view of the bicycle brake device shown in FIG. 2.

The brake mechanism 1 is connected to the tip portion of a brake wire 10 which extends from a brake lever 7 installed on the handlebar 6. As is shown in FIGS. 2 and 3, this brake mechanism 1 has a brake arm 12a which is fastened to the tip end of the inner wire 10b of the brake wire 10 via a connector 11a, and a brake arm 12b which is installed so that it contacts the outer wire 10a of the brake wire 10 via a connector 11b. The gap between the brake shoes and the side surfaces of the wheel rim may be adjusted by adjusting the fastening position at the tip of the inner wire. Both brake arms 12a and 12b are constructed so that they are more or less symmetrical with respect to the left-right direction, and the intermediate parts of the brake arms (with respect to the vertical direction) are bent outward in a convex bow shape. The lower end portions of the brake arms 12a and 12b are supported by fastening pins 15a and 15b so that the lower end portions are free to pivot. As used herein, the terms "upper," "lower," "inner," and "outer" are to be interpreted as viewed in FIG. 3. The fastening pins 15a and 15b protrude forward from seats 13a and 13b which are respectively soldered to intermediate portions of the front fork 4. Three retaining holes 20a, 20b are formed one above the other on the same circumferential line that is centered on the axis of the corresponding fastening pin 15a or 15b in the inside surface of each seat 13a, 13b. These retaining holes 20a and 20b are holes that are used to adjust the strength of the return springs in an ordinary cantilever type brake mechanism.

Attachment bolts 16a and 16b are fastened to the tip ends of the fastening pins 15a and 15b. These attachment bolts 16a and 16b are used to regulate the movement of the brake arms 12a and 12b in the axial direction. Shoe fastening links 17a and 17b, which are used to attach the brake shoes 19a and 19b, are attached more or less horizontally to intermediate portions of the brake arms 12a and 12b. The rear end portions of these shoe fastening links 17a and 17b are pivotally connected to the brake arms 12a and 12b by means of attachment pins 18a and 18b.

The members described below which include the shoe fastening links 17a and 17b are symmetrical with respect to the left-right direction. Accordingly, in the following description, only the members on the right side of FIG. 3 will be described, and a description of the members on the left side of FIG. 3 will be omitted.

Figure 4:
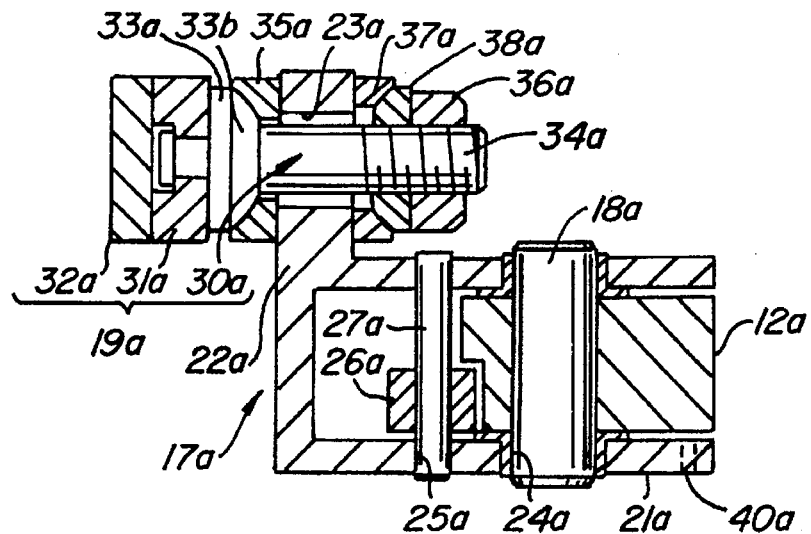
FIG. 4 is a cross sectional view of the bicycle brake device taken along line IV—IV in FIG. 3.

As shown in FIG. 4, the shoe fastening link 17a has a C-shaped link attachment part 21a and a shoe attachment part 22a which extends at right angles from the link attachment part 21a. A long shoe attachment slot 23a which is oriented in the vertical direction (i.e., the direction of depth in FIG. 4) is formed in the shoe attachment part 22a. An attachment hole 24a which is used for the attachment of an attachment pin 18a and a fastening hole 25a which is used for the fastening of a supporting pin 27a are formed side by side in the link attachment part 21a. The supporting pin 27a is used to pivotally support an auxiliary link 26a (described later).

Figure 5:
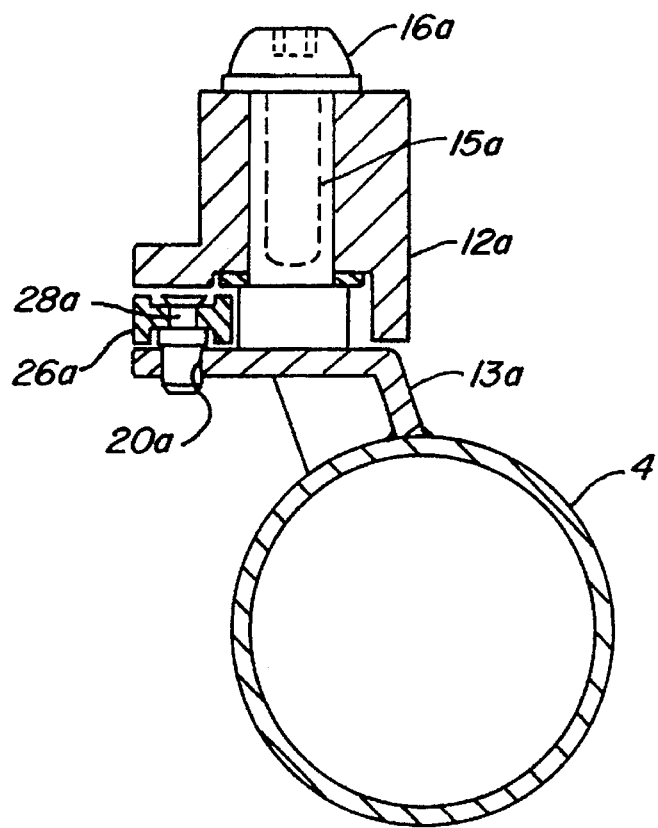
FIG. 5 is cross sectional view of the bicycle brake device taken along line V—V in FIG. 3.

As is shown in FIG. 3, the auxiliary link 26a is a rod-form member formed in the shape of an "S." The upper end portion of this auxiliary link 26a is pivotally connected to the link attachment part 21a of the shoe fastening link 17a. As shown in FIG. 5, the lower end portion of the auxiliary link 26a is pivotally connected to the seat 13a by a cantilever pin 28a. The cantilever pin 28a is inserted into a retaining hole 20a formed in the seat 13a.

In this embodiment, the distance from the axis of the fastening pin 15a to the axis of the cantilever pin 28a is equal to the distance from the axis of the attachment pin 18a to the axis of the supporting pin 27a. Furthermore, the distance from the axis of the supporting pin 27a disposed on both sides of the auxiliary link 26a to the axis of the cantilever pin 28a is equal to the distance from the axis of the fastening pin 15a to the axis of the attachment pin 18a. In other words, these four pins are arranged so that they form the vertices of a parallelogram, and a link mechanism is formed by the portion of the brake arm 12a located between two of the pins, the seat 13a, a portion of the shoe fastening link 17a and the auxiliary link 26a. Thus, the shoe fastening link 17a moves parallel to the line segment connecting the axis of the fastening pin 15a and the axis of the cantilever pin 28a.

As shown in FIG. 4, the brake shoe 19a is inserted into the shoe attachment slot 23a. This brake shoe 19a has a shoe fastening pin 30a, a shoe holder 31a which is fastened to the tip end of the shoe fastening pin 30a, and a friction pad 32a (made of an elastic material) of shoe fastening pin 30a. A large-diameter portion 33a which has a convex member 33b that forms a portion of a spherical surface. A concave washer 35a which has a concave surface that engages with the convex member 33b of the large-diameter portion 33a is installed between the large-diameter portion 33a and the shoe fastening link 17a. A male screw 34a is formed on the tip end portion of the fastening pin 30a, and an attachment nut 36a is screwed onto this male screw 34a. A concave washer 37a which has a concave surface that forms a portion of a spherical surface, and a convex washer 38a which has a convex surface that engages with the concave surface of the concave washer 37a, are installed between the engagement nut 36a and the shoe attachment part 22a. As a result of this structure, the vertical position and inclination of the brake shoe 19a can be freely adjusted in accordance with the position and inclination of the side surface 5a of the rim 5 by tightening down the brake shoe 19a inside the slot 23a of the shoe attachment part 22a with the concave washer 35a and concave and convex washers 37a and 38a interposed.

A spring attachment hole 40a is formed in the tip end of the of the link attachment part 21a of the shoe fastening link 17a. As is shown in FIG. 1, the lower end of a coil spring 41a is anchored in this spring attachment hole 40a. The upper end of the coil spring 41a is connected to the lower end of an adjustment hook 42a. The vertical position of this adjustment hook 42a can be adjusted by means of an adjustment bolt 43a which is installed on the back surface of the upper end of the brake arm 12a. The vertical position of the adjustment hook 42a is adjusted by turning the adjustment bolt 43a. As a result, the spring force of the coil spring 41a, i.e., the return force of the brake arm 12a when braking is released, can be adjusted as desired.

Figure 6A:
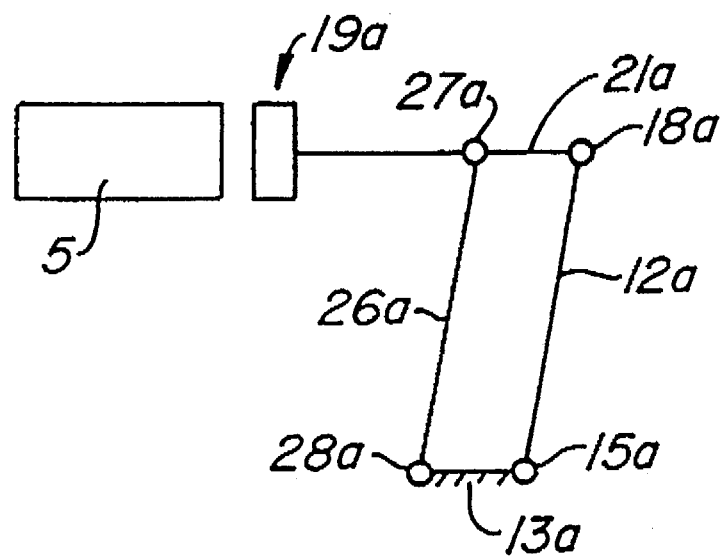
FIG. 6 is a schematic diagram showing the operation of the brake device shown in FIG. 3.
Figure 6B:
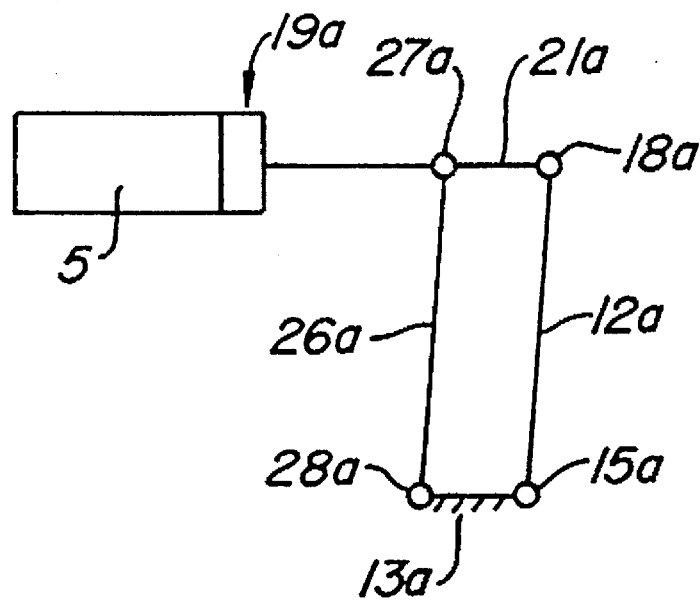

In operation, when the rider operates the brake lever 7, the inner wire 10b is pulled into the outer wire 10a so that the upper end portions of the brake arms 12a and 12b are pulled inward. Thereafter, the friction pads 32a and 32b on the brake shoes 19a and 19b are pressed against the sides surfaces 5a of the rim 5, thus causing a braking action to be performed. As a result of the action of the link mechanisms including the respective auxiliary links 26a and 26b, the shoe fastening links 17a and 17b move inward while maintaining a horizontal attitude. This is shown in FIGS. 6 (A) and (B). Consequently, the friction pads 32a and 32b reliably contact the rim 5 so that a strong braking force can be obtained. Since the auxiliary links 26a and 26b are positioned on the insides of the brake arms 12a and 12b, the width dimension of the brake mechanism 1 can be made more compact. The braking mechanism 1 no longer protrudes from the front fork 4, so there is no danger that the mechanism 1 will strike the legs of the rider, etc., during operation of the bicycle.

When the brake lever 7 is released, the brake wire 10 relaxes so that the coil springs 41a and 41b cause the brake arms 12a and 12b to pivot in the opening direction. As a result, the tip ends of the friction pads 32a and 32b on the brake shoes 19a and 19b are withdrawn from the side surfaces 5a of the rim, so that the braking action is released.

Figure 7:
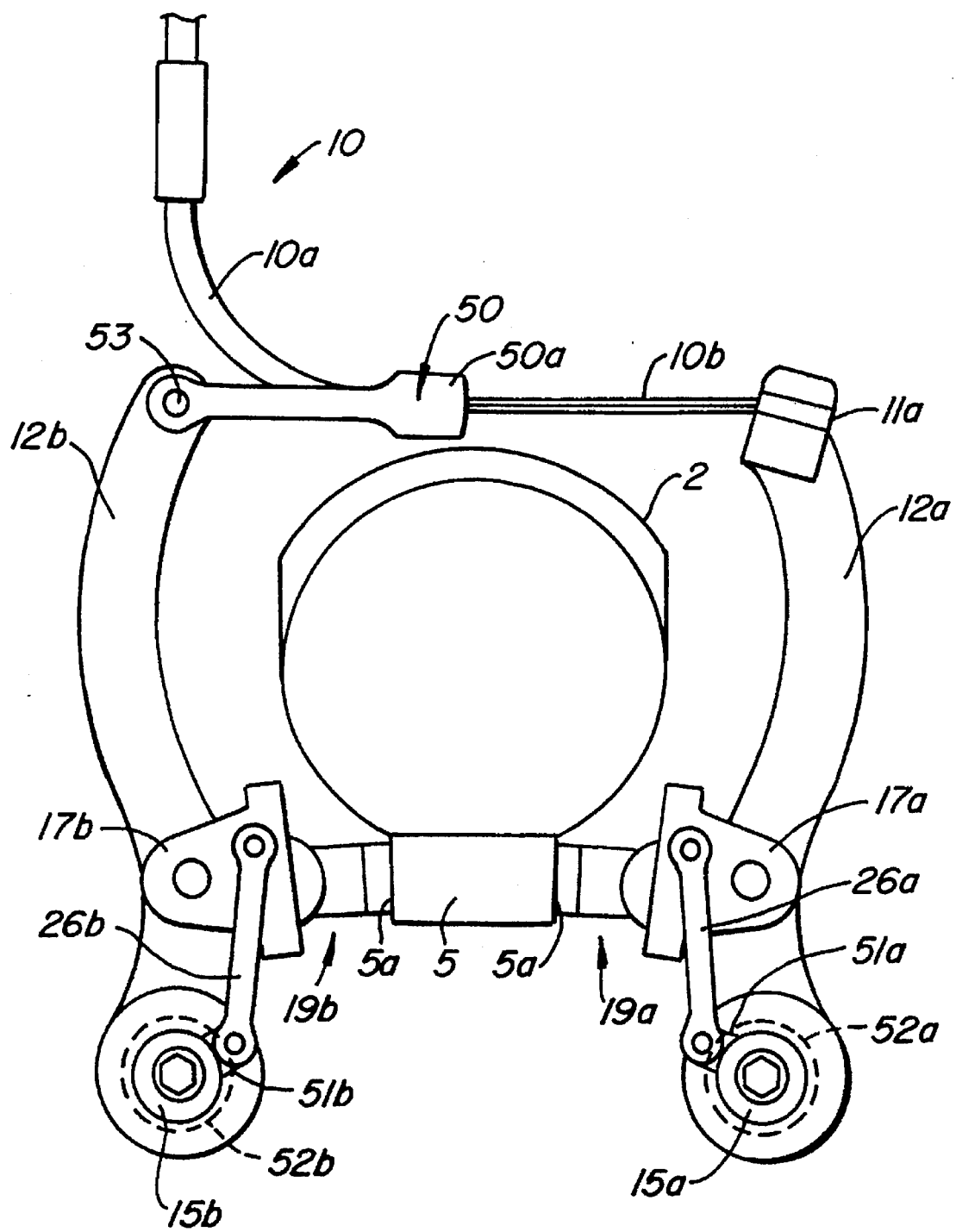
FIG. 7 is a front view of an alternative embodiment of a bicycle brake device according to the present invention.

FIG. 7 is a diagram of an alternative embodiment of a bicycle brake device according to the present invention. As shown in FIG. 7, a connecting arm 50 is connected at one end 53 to brake arm 12b and at the other end to the outer brake wire 10a, thus mounting the outer brake wire 10a more inwardly than the previous embodiment. The inner wire 10b thereafter extends toward the brake arm 12a from the tip end of the connecting arm 50. In this case, the brake wire 10 does not protrude to the outside, and the length of the exposed inner wire 10b is short. Thus, the brake wire 10 is less likely to interfere with the operation of the bicycle.

Furthermore, in the embodiment shown in FIG. 7, the lower end portions of the auxiliary links 26a and 26b are pivotally supported by supporting members 51a and 51b which are attached to the insides of the fastening pins 15a and 15b. The fastening pins 15a and 15b allow the link members 26a and 26b to be fastened with greater precision, so that there is no fluctuation in the attitude of the shoe attachment members. Moreover, return springs 52a and 52b which return the brake arms 12a and 12b to their release positions are installed around the fastening pins 15a and 15 inside the lower end portions (boss portions) of the brake arms 12a and 12b. One end of each of the return springs 52a and 52b is anchored in one of the plurality of retaining holes 20a, 20b, and the opposite ends of the return springs 52a and 52b are anchored to the lower end portions of the brake arms 12a and 12b. This allows the brake device according to the present invention to be installed on existing cantilever brake mounting posts.

The shoe fastening links 17a and 17b have the external shape of pillow blocks, so the brake shoes can be attached so that the braking surfaces of the brake shoes 19a and 19b face slightly upward. The reason for such an attachment with the braking surfaces of the brake shoes 19a and 19b facing slightly upward is that there are cases in which the side surfaces 5a of the rim 5 of the wheel are inclined toward the center. In this case the fastening of the brake shoes 19a and 19b to the shoe fastening links 17a and 17b may be accomplished via concave washer 35a and concave and convex washers 37a and 38a which have a semi-cylindrical shape instead of a spherical shape. This facilitates the assembly and adjustment of the brake shoes 19a and 19b by limiting the adjustment directions to (e.g.) upward and downward inclination. Other constituent parts and operations are the same as in the embodiment described above, so a description of the constituent parts and operations is omitted here.

In the embodiment described above, the four pins mentioned above were positioned at the vertices of a parallelogram. However, instead of positioning these pins at the vertices of a parallelogram, it would also be possible to alter the respective lengths so that the tip ends of the brake shoes 19a and 19b conform to the side surfaces 5a of the rim 4. By thus altering the lengths, it is possible (for example) to cause the shoe fastening links 17a and 17b to move in any desired attitude (upward-facing or horizontal) at the time of contact.

It should be readily apparent that the specific structure of the bicycle brake device may be varied in many ways without departing from the spirit of the invention. Accordingly, the scope of the invention should not be limited by the specific embodiments disclosed. Instead, the scope of the invention should be determined by the following claims.

What is claimed is:

1. A cantilever brake apparatus for attachment to a bicycle comprising:

a first brake mechanism and a second brake mechanism, each brake mechanism including:

a brake arm (12a,12b) having an upper portion and a lower portion; a wire connector attached to an upper portion of the brake arm;

a link member (26a,26b) disposed on an inner side of the brake arm (12a,12b), the link member (26a,26b) having an upper portion and a lower portion;

a shoe attachment member (17a,17b) for attaching a brake shoe (19a,19b) thereto, the shoe attachment member (17a,17b) being pivotally coupled to the upper portion of the brake arm (12a,12b) and to the upper portion of the link member (26a,26b) so that the upper portion of the brake arm (12a,12b) and the upper portion of the link member (26a,26b) are spaced apart from each other; and wherein the lower portion of the brake arm (12a,12b) and the lower portion of the link member (26a,26b) are adapted to be pivotally mounted to the bicycle so that the lower portion of the brake arm (12a,12b) and the lower portion of the link member (26a ,26b) pivot when a braking force is applied by the cantilever brake apparatus to cause the brake shoe (19a, 19b) to move toward a wheel rim; and wherein the lower portion of the brake arm (12a,12b) and the lower portion of the link member (26a,26b) are spaced apart from each other for forming a four-bar link mechanism with the shoe attachment member (17a,17b).

2. The apparatus according to claim 1 wherein each brake arm is adapted to be supported by a fastening pin (15a,15b) extending from a seat (13a,13b) installed on the bicycle, wherein the lower portion of the brake arm (12a,12b) is adapted to be pivotally mounted to the fastening pin (15a, 15b), and wherein the lower portion of the link member (26a,26b) is adapted to be pivotally mounted to the seat (13a,13b).

3. The apparatus according to claim 2 further comprising, in each brake mechanism, a biasing member connected to the brake arm (12a,12b) and to the shoe attachment member (17a,17b) for biasing the shoe attachment member (17a,17b) toward an open position.

4. The apparatus according to claim 2 further comprising, in each brake mechanism, a coil spring having a first end connected to the brake arm (12a,12b) and a second end for connecting to the seat (13a,13b).

5. The apparatus according to claim 2 wherein, in each brake mechanism, the fastening pin (15a, 15b) includes a supporting member (51a,51b) for attachment of the lower portion of the link member (26a,26b).

6. The apparatus according to claim 1 wherein, in each brake mechanism, the lower portion of the brake arm (12a,12b) and the lower portion of the link member (26a, 26b) are adapted to be pivotally mounted to the bicycle so that the shoe attachment member (17a,17b) maintains a generally horizontal attitude when the brake arm (12a,12b) pivots relative to the bicycle.

7. The apparatus according to claim 1 wherein, in each brake mechanism, the link member (26a,26b) is mounted between the brake arm (12a,12b) and a brake shoe (19a,19b) mounted to the shoe attachment member (17a,17b).

8. The apparatus according to claim 1 wherein each brake arm (12a,12b) is formed as a single piece.

9. A cantilever brake apparatus for attachment to a bicycle comprising:
   a first brake mechanism and a second brake mechanism, each brake mechanism including:
      a brake arm (12a,12b) having an upper portion and a lower portion;
      link member (26a,26b) having an upper portion and a lower portion;
      a shoe attachment member (17a,17b) attached to a brake shoe (19a,19b), the shoe attachment member (17a,17b) being coupled to the upper portion of the brake arm (12a,12b) and to the upper portion of the link member (26a,26b);
      wherein the lower portion of the brake arm (12a,12b) and the lower portion of the link member (26a,26b) are adapted to be pivotally mounted to the bicycle;
      wherein the shoe attachment member (17a,17b) includes an elongated slot (23a), and wherein the brake shoe (19a,19b) comprises:
         a pin (30a) extending through the slot (23a), the pin (30a) having a threaded portion (34a) on a first end thereof;
         a friction pad (32a) mounted to a second end of the pin (30a);
         a convex member (33b) disposed between the attachment member (17a,17b) and the friction pad (32a); and
         a concave member (35a) disposed between the attachment member (17a,17b) and the friction pad (32a) for engaging the convex member (33b).

10. The apparatus according to claim 9 wherein each brake arm is adapted to be supported by a fastening pin (15a,15b) extending from a seat (13a,13b) installed on the bicycle, wherein the lower portion of the brake arm (12a, 12b) is adapted to be pivotally mounted to the fastening pin (15a,15b), and wherein the lower portion of the link member (26a,26b) is adapted to be pivotally mounted to the seat (13a,13b).

11. A cantilever brake apparatus for attachment to a bicycle comprising:
   a first brake mechanism and a second brake mechanism, each brake mechanism including:
      a brake arm (12a,12b) having an upper portion and a lower portion;
      a link member (26a,26b) having an upper portion and a lower portion;
      a shoe attachment member (17a,17b) attached to a brake shoe (19a,19b), the shoe attachment member (17a,17b) being coupled to the upper portion of the brake arm (12a,12b) and to the upper portion of the link member (26a,26b);
      wherein the lower portion of the brake arm (12a,12b) and the lower portion of the link member (26a,26b) are adapted to be pivotally mounted to the bicycle;
      wherein the shoe attachment member (17a,17b) includes an elongated slot (23a), and wherein the brake shoe comprises:
         a pin (30a) extending through the slot (23a), the pin (30a) having a threaded portion (34a) on a first end thereof;
         a friction pad (32a) mounted to a second end of the pin (30a);
         a nut (36a) disposed on the threaded portion (34a) of the pin (30a)
         a convex member (38a) disposed between the attachment member (17a,17b) and the nut (36a); and
         a concave member (37a) disposed between the attachment member (17a,17b) and the nut (36a) for engaging the convex member (33a).

12. The apparatus according to claim 11 wherein each brake arm is adapted to be supported by a fastening pin (15a,15b) extending from a seat (13a,13b) installed on the bicycle, wherein the lower portion of the brake arm (12a, 12b) is adapted to be pivotally mounted to the fastening pin (15a,15b), and wherein the lower portion of the link member (26a,26b) is adapted to be pivotally mounted to the seat (13a,13b).

13. A cantilever brake apparatus for attachment to a bicycle comprising:
   a first brake mechanism and a second brake mechanism, each brake mechanism including:
      a brake arm (12a,12b) having an upper portion and a lower portion;
      a link member (26a,26b) having an upper portion and a lower portion;
      a shoe attachment member (17a,17b) for attaching a brake shoe (19a,19b) thereto, the shoe attachment member (17a,17b) being coupled to the upper portion of the brake arm (12a,12b) and to the upper portion of the link member (26a,26b);
      wherein the lower portion of the brake arm (12a,12b) and the lower portion of the link member (26a,26b) are adapted to be pivotally mounted to the bicycle and;
      wherein each brake arm is adapted to be supported by a fastening pin (15a,15b) extending from a seat (13a,13b) installed on the bicycle, wherein the lower portion of the brake arm (12a,12b) is adapted to be pivotally mounted to the fastening pin (15a,15b), wherein the lower portion of the link member (26a, 26b) is adapted to be pivotally mounted to the seat (13a,13b), wherein the seat (13a,13b) has a plurality of holes (20a,20b) located on a common circumferential line centered on an axis of the fastening pin (15a,15b), and wherein the lower end portion of the link member (26a,26b) is pivotally supported in one of the holes (20a,20b).

14. The apparatus according to claim 13 wherein, in each brake mechanism, the link member (26a,26b) is disposed on an inner side of the brake arm (12a,12b).

15. A cantilever brake apparatus for attachment to a bicycle comprising:

a first brake mechanism and a second brake mechanism, each brake mechanism including:

a fastening pin (15a,15b) extending from a seat (13a, 13b), the seat (13a,13b) being adapted for mounting on the bicycle a brake arm (12a,12b) having a lower portion pivotally mounted to the fastening pin;

a link member (26a,26b) having a lower portion pivotally connected to the seat (13a,13b);

a shoe attachment member (17a,17b) for attaching a brake shoe (19a,19b) thereto, the shoe attachment member (17a,17b) being coupled to an upper portion of the brake arm (12a,12b) and to an upper portion of the link member (26a,26b) so that the upper portion of the brake arm (12a,12b) and the upper portion of the link member (26a,26b) are spaced apart from each other;

wherein the lower portion of the brake arm (12a,12b) and the lower portion of the link member (26a,26b) are spaced apart from each other for forming a four-bar link mechanism with the shoe attachment member (17a,17b);

wherein the link member (26a,26b) is disposed on an inner side of the brake arm (12a,12b); and wherein the lower portion of the brake arm (12a,12b) and the lower portion of the link member (26a,26b) pivot when a braking force is applied by the cantilever brake apparatus to cause the brake shoe (19a, 19b) to move toward a wheel rim.

16. The apparatus according to claim 15 wherein, in each brake mechanism, the brake arm (12a,12b), the link member (26a,26b), and the shoe attachment member (17a,17b) are connected so that the shoe attachment member (17a,17b) maintains a generally horizontal attitude when the brake arm (12a,12b) pivots relative to the bicycle.

17. The apparatus according to claim 15 wherein each brake arm (12a,12b) is formed as a single piece.

* * * * *